UNITED STATES PATENT OFFICE.

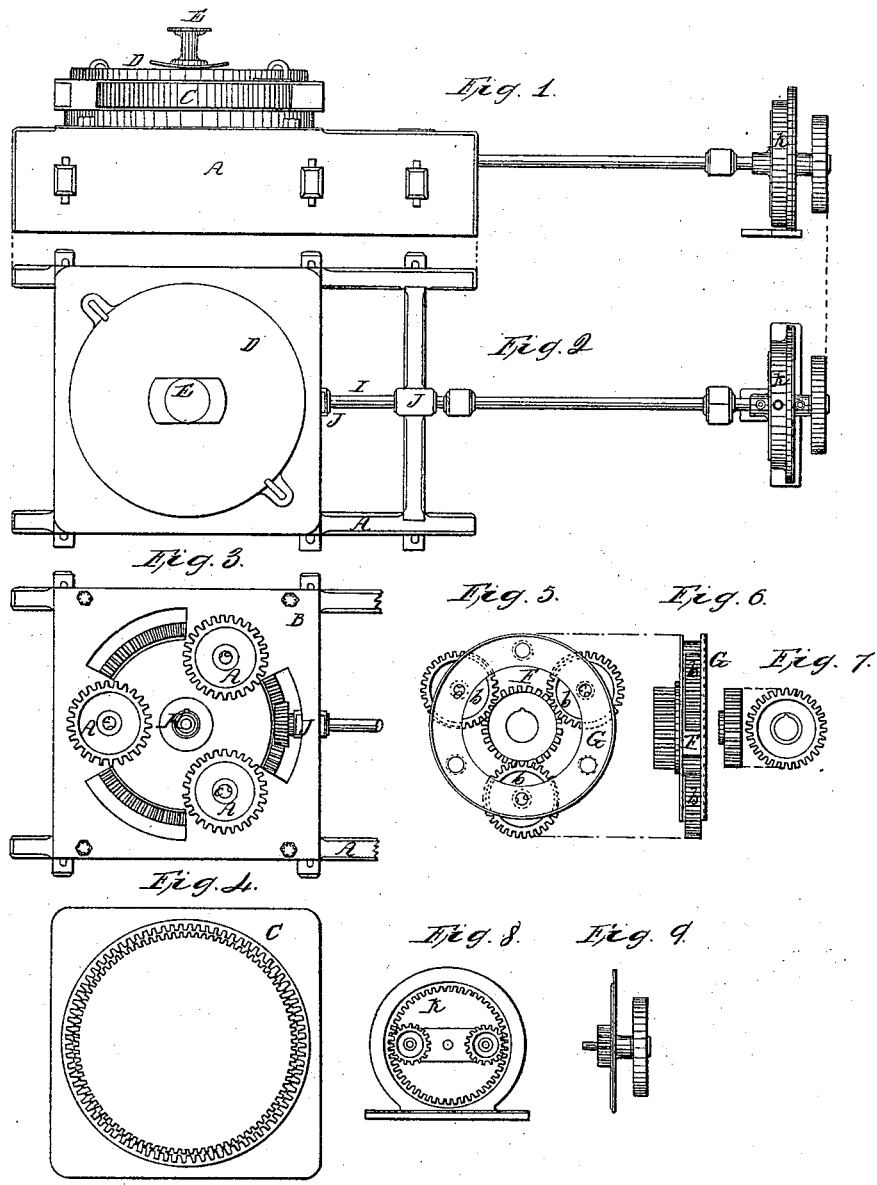

CYRUS AVERY, OF TUNKHANNOCK, PENNSYLVANIA.

GEARING FOR HORSE-POWERS, &c.

Specification of Letters Patent No. 28,550, dated June 5, 1860.

*To all whom it may concern:*

Be it known that I, CYRUS AVERY, of Tunkhannock, in the county of Wyoming and State of Pennsylvania, have invented a new and useful Improvement in Cog or Tooth Gearing for Horse-Power and other Purposes; and I do hereby declare that the following is a full and exact description thereof, reference being had to the accompanying drawings and to the letters of reference marked thereon.

The nature of my invention consists in the peculiar arrangement of the gearing—first, making the master wheel in a cone form; second, running the main shaft without any bearing except the stepping; third, the manner of oiling in cold weather; fourth, securing all parts from dirt; fifth, seating the driver so that he will not be carried around with the motion of the team; sixth, running one end of the band wheel shaft into the end of the tumbling shaft running the same way but with greater velocity, and, lastly, by the whole combined arrangement in lessening the friction.

To enable others skilled in the art to make and use my invention I will describe its construction and operation for a horse-power.

The frame A upon which the bed plate rests is formed of plank, the side pieces to be from ten to twelve feet long and from twelve to sixteen inches wide and about three inches thick and framed together by three cross pieces, one cross piece about two feet of the end, the second about two feet six inches from that, the third cross piece within about a foot of the other end, these cross pieces to be two or three inches narrower than the side pieces, about two feet two inches in length between shoulders, the bottom of the frame is filled in with two inch plank jointed together in order to stiffen the frame and to keep out dirt.

B is the bed plate made of cast iron five-eighths of an inch thick, about thirty-two inches square and bolted to the side plank near the corners. Fitted to this plate are three studs or journals for the intermediate wheels to revolve on, with a recess or cup around the same for a reservoir for oil, with heavy stays on the under side running from one stud to the other and from the studs out into the frame.

C is the main wheel of cast iron. The lower section is about thirty inches across at the pitch line and from three to four inches width of periphery, the second section about 28 inches across on the pitch line, with about four inches width of periphery, on the inside of which are cogs or teeth, the lower section the whole width of periphery, the upper section about an inch shorter than the periphery and more numerous. On the outside of this wheel horns are cast in such a way as to form recesses for the ends of the sweeps as shown in the drawing. On the lower edge is a wrought iron band shrunk on about five eighths of an inch square to strengthen the wheel and to hold the wheel from lifting up.

D is the cover cast about three-fourths of an inch dishing, with a hole through the center for the staff of the driver's seat to pass through, with two horns projecting out, one opposite the other, with hooks projecting down to hook it on to the main wheel in such a way that if the gearing rub against the cover it will not unhook it. On the top of these two horns are two handles in the shape of an arch.

E is the driver's seat made of wood or iron or both, sixteen or eighteen inches high, having a shaft under the seat with a socket in the lower end to set on the staff loosely, with a foot piece projecting out over the cover. When the driver places his feet on this foot piece he will not revolve around with the machine. The staff is about thirty inches long of iron or wood, the lower end passing through the cover and through the main shaft loosely fitted into the center of the stepping, the upper end into the socket of the driver seat.

*a a a* are the lower intermediate wheels about eleven inches in diameter and width of periphery to correspond with the main wheel. These wheels have their bearings on the studs or journals in the bed plate.

F is a plate with a large hole through the center, upon the under side of which is a pinion to take into the lower intermediate wheels. Between the teeth of the pinion are holes through the plate for lubricating the teeth of the pinion. This plate has three studs or journals of wrought iron cast or fastened securely into the plate, around which are cups or reservoirs for holding oil. Between these studs are holes about four inches in diameter to admit the studs of the annular ring.

G is the annular ring about twenty-two inches in diameter and about half an inch thick with a hole in the center about fourteen inches in diameter. On this ring are three hollow studs about four inches in diameter and four inches in length with a three inch hole through the center.

Between each stud is a hole about an inch and a quarter in diameter to admit the ends of the studs in the bed plate F.

b b b are the upper intermediate wheels about ten inches in diameter and three inches periphery revolving on the studs or journals in the plate F.

c c c c are studs or journals with a groove cut in them on the opposite side from where the wheels bear. The object of the grooves is for lubricating the journals. In cold weather the unguent can be pressed in with a stick or rod of iron, or the wheels can be taken off and the grooves filled with the unguent. In warm weather a braided wick saturated with oil can be slipped down into the groove.

H is the main shaft about twenty-two inches in length and about five inches in diameter having a hole through it about three inches in diameter. On the bottom of this shaft is cast or fitted a bevel wheel about twenty-six inches in diameter about three inches face to the teeth. On the top end of this shaft is fitted a pinion with groove and feather and is held in position by the three upper intermediate wheels. The stepping is a dish with a hub in the center and a hole through the hub for the staff of the driver's seat to fit into. The outside of this hub is fitted loosely into the bottom of the main shaft and lubricated through the main shaft. The stepping is fastened to the bottom plank.

I is the first section of the tumbling rod. On one end is fitted a bevel pinion about six inches in diameter. To take into the bevel wheel of the other end is fitted a knuckle to connect with the second section of the tumbling rod. This rod has two journals about five inches long.

J is the boxes for the tumbling rod cast with a hole through them about one and one-fourth inches in diameter and five inches in length. On the bottom is a horn about one and a half inches in diameter and three inches in length. These horns fit into the cross pieces of the frame. If the frame springs they will revolve. On the top is an oil cup divided into two parts, one for oil and the other for tallow, to be covered up tight.

K is the jack frame made of scantling three by six inches, the main piece about three feet long. Two cross pieces are halved to this main piece, one within six inches of each end. The shell is made of cast iron in the form of a dish about fourteen inches in diameter on the pitch line with teeth on the inside and about two inches width of periphery. On the outside in the center is a hub about six inches long with a hole through it one and a half inches in diameter. On the out edge of this shell is a flange projecting out about one inch. On the bottom is a flange to bolt it to the wooden bed. There is another shell of the same size though less dishing, with a hub projecting out five inches, with an inch and a quarter hole through it, the two shells to be bolted together to form an air tight joint. The last section of the tumbling rod I, one foot in length and one and a half inches in diameter, revolves through the hub of the main shell. On the out end of this shaft is a part of a knuckle joint. On the inside are two arms projecting out six inches. Pins are fastened to each arm in the form of a crank. Wheels revolve on these pins having teeth that take into the teeth in the main shell. In this end of the shaft a hole is drilled seven-eighths of an inch in diameter three inches deep.

L is the band wheel of a proper size to suit the rest of the gearing. The shaft of the band wheel passes through the shell into the tumbling rod. A pinion is tightly fitted on this shaft to take into the wheels on the pins that revolve with the tumbling rod. This jack can be taken to the cylinder and used without a band wheel. Friction rollers may be set in the bed plate to keep the main wheel from rubbing.

All parts of the machine may be varied in size.

I will now refer to the figures upon the drawing.

Figure 1, is a view of the entire machine on a level with the eye. Fig. 2, is a view of the same looking perpendicular to the eye. Fig. 3, is a view of the bed plate, lower intermediate wheels, the bevel pinion, and part of the bevel wheel. Fig. 4, is a view of the main wheel bottom side up looking perpendicular to the eye. Fig. 5, is a plan of the upper intermediate wheels showing the oil holes through the annular plate and annular ring; Fig. 6, edge view of the same; Fig. 7, edge and top view of the center pinion looking perpendicular to the eye; Fig. 8, inside view of jack with center pinion removed. Fig. 9, is an edge view of center pinion and cover of jack looking perpendicular to the eye.

What I claim as my invention and desire to secure by Letters Patent is:

1. Constructing the main wheel C, in the form of a cone, and each section with a narrow periphery; the teeth on the lower intermediate wheels A, A, A, running under a part of the main wheel C, which is smaller than the part which they take into, following the same arrangement up to any number desired; the upper series held down by the top or cover D; the whole constructed and working as specified.

2. The peculiar construction, combination and operation of the intermediate wheels b, b, b, and the main wheel C, and the center pinion Fig. 7, both when at rest and in motion; substantially as specified above.

3. The manner in which the main shaft is held in position, namely by the intermediate wheels taking into the main wheel and into the center pinion thus enabling me to dispense with all bearings except the stepping.

4. The manner of seating the driver namely putting a post through the cover and main shaft into the step and a seat on top of this post that will revolve or stand stationary at the driver's pleasure.

5. Giving the band wheel K an increased velocity of one revolution over and above the velocity imparted by the tumbling shaft M; by means of the cogged or milled stationary concave wheel or ring, M, Fig. 8, one or more intermediate wheels, Fig. 8, revolving on their own axis, and the center pinion wheel L, Fig. 9.

6. Having one end of the band wheel shaft in the end of the tumbling rod and revolving the same way.

7. Having the whole machine shut up tight by the way it is constructed without boxing.

CYRUS AVERY.

Witnesses:
Z. E. WHITE,
H. S. MILLER.